Figure 1:
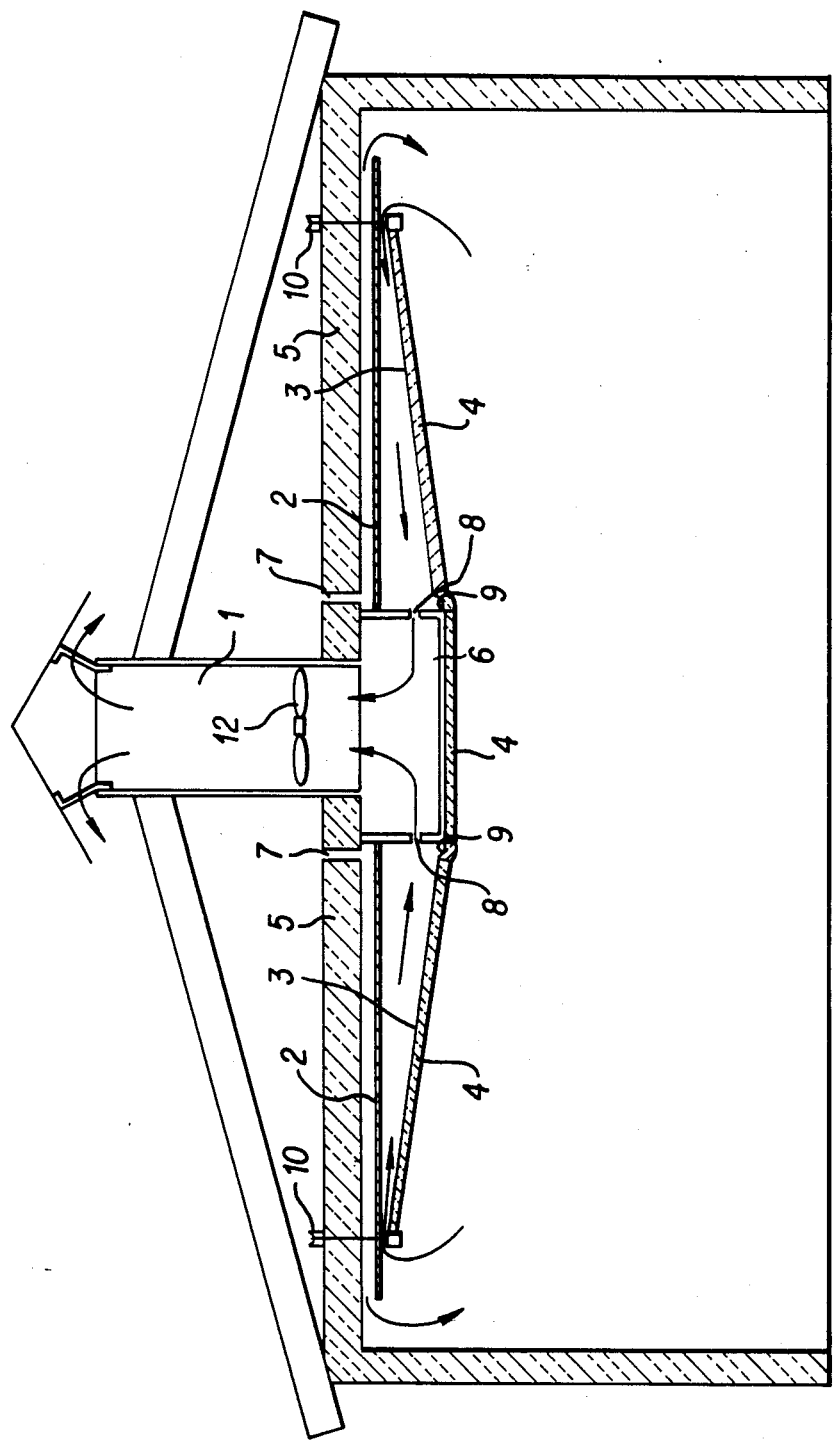

United States Patent [19]

Toukola

[11] Patent Number: 4,671,350
[45] Date of Patent: Jun. 9, 1987

[54] VENTILATION AND HEAT EXCHANGING SYSTEM FOR PREMISES HOUSING ANIMALS, IN PARTICULAR FOR POULTRY FARMING

[76] Inventor: Risto Toukola, Kuurinniityntie 29 A, 02760 Espoo 76, Finland

[21] Appl. No.: 706,941

[22] Filed: Mar. 6, 1985

[30] Foreign Application Priority Data

Mar. 6, 1984 [FI] Finland ............................ 840878

[51] Int. Cl.[4] .................... F24H 3/10; F24F 7/00; F28F 13/08
[52] U.S. Cl. ................................ 165/54; 165/96; 165/135; 165/913; 98/33.1
[58] Field of Search .............. 165/54, 96, 135, 913, 165/921, 909; 98/33.1

[56] References Cited

U.S. PATENT DOCUMENTS

| | | | |
|---|---|---|---|
| 2,042,141 | 5/1936 | Campbell | 165/54 |
| 2,488,333 | 11/1949 | Schlachter | 98/33.1 |
| 3,581,649 | 6/1971 | Ravenhorst | 98/33.1 |
| 4,034,803 | 7/1977 | Reed et al. | 165/135 |
| 4,043,256 | 8/1977 | Van Huis | 98/33.1 |
| 4,063,590 | 12/1977 | McConnell | 165/135 |
| 4,184,538 | 1/1980 | Ravenhorst | 98/33.1 |

FOREIGN PATENT DOCUMENTS

| | | |
|---|---|---|
| 3113280 | 10/1982 | Fed. Rep. of Germany . |
| 3313936 | 12/1983 | Fed. Rep. of Germany ........ 165/54 |
| 772078 | 6/1979 | Finland . |
| 62413 | 8/1982 | Finland . |
| 2399625 | 4/1979 | France ............................... 165/54 |
| 0009036 | 1/1978 | Japan ................................... 165/54 |
| 0053528 | 8/1911 | Switzerland ....................... 98/33.1 |

Primary Examiner—Albert W. Davis, Jr.
Assistant Examiner—John K. Ford
Attorney, Agent, or Firm—Bernard, Rothwell & Brown

[57] ABSTRACT

Ventilation and heat exchanging system for premises housing animals, especially poultry, the system having one or more fans, one or more ducts for outgoing air which extends through an inner ceiling to a general collecting air flue, on the sides of which connect two vertically spaced sheets the space between which are connected to the collecting air flue, and behind the outer sheet which functions as a heat exchange sheet there opens one or more ducts for air intake (7) through an inner ceiling. Of the mentioned sheets the lower surface of the inner sheet is equipped by a heat insulating layer (4), the heat insulating ability of which at least in the vicinity of the ducts for incoming and outgoing air (1 and 7) in essence corresponds with the heat insulating ability normally required by an inner ceiling.

6 Claims, 2 Drawing Figures

VENTILATION AND HEAT EXCHANGING SYSTEM FOR PREMISES HOUSING ANIMALS, IN PARTICULAR FOR POULTRY FARMING

The invention relates to premises housing animals, especially poultry, and concerns a ventilation and heat exchanging system which contains one or more fans, one or more ducts for outgoing air, which extend extend through a inner ceiling to the general collecting air flue. Two flat sheets that are at a vertical distance of each other join the general collecting air flue, the gap between the sheets connecting to the general collecting air flue. Above the upper sheet, which functions as a heat exchanging sheet, there opens one or more ventilating ducts for air intake. This system is known from the FI-Patent publication No. 62413. In that system the outgoing air which drops in temperature cools the lower guiding sheet, and a great deal of warmth is transmitted to the outgoing air via this guiding sheet. Furthermore the humidity of the housing premises, condenses on the cold surface of the sheet, and leads to water dripping down from it. In addition, this lower guiding sheet continually absorbs the radiating heat from the inside of the housing facility.

The present invention means to improve the aforementioned system in the sense that the defects mentioned are avoided.

This invention is achieved through the characteristics of the invention related to in the enclosed claims.

The invention is described with reference to the drawings. In these

Figure 2:
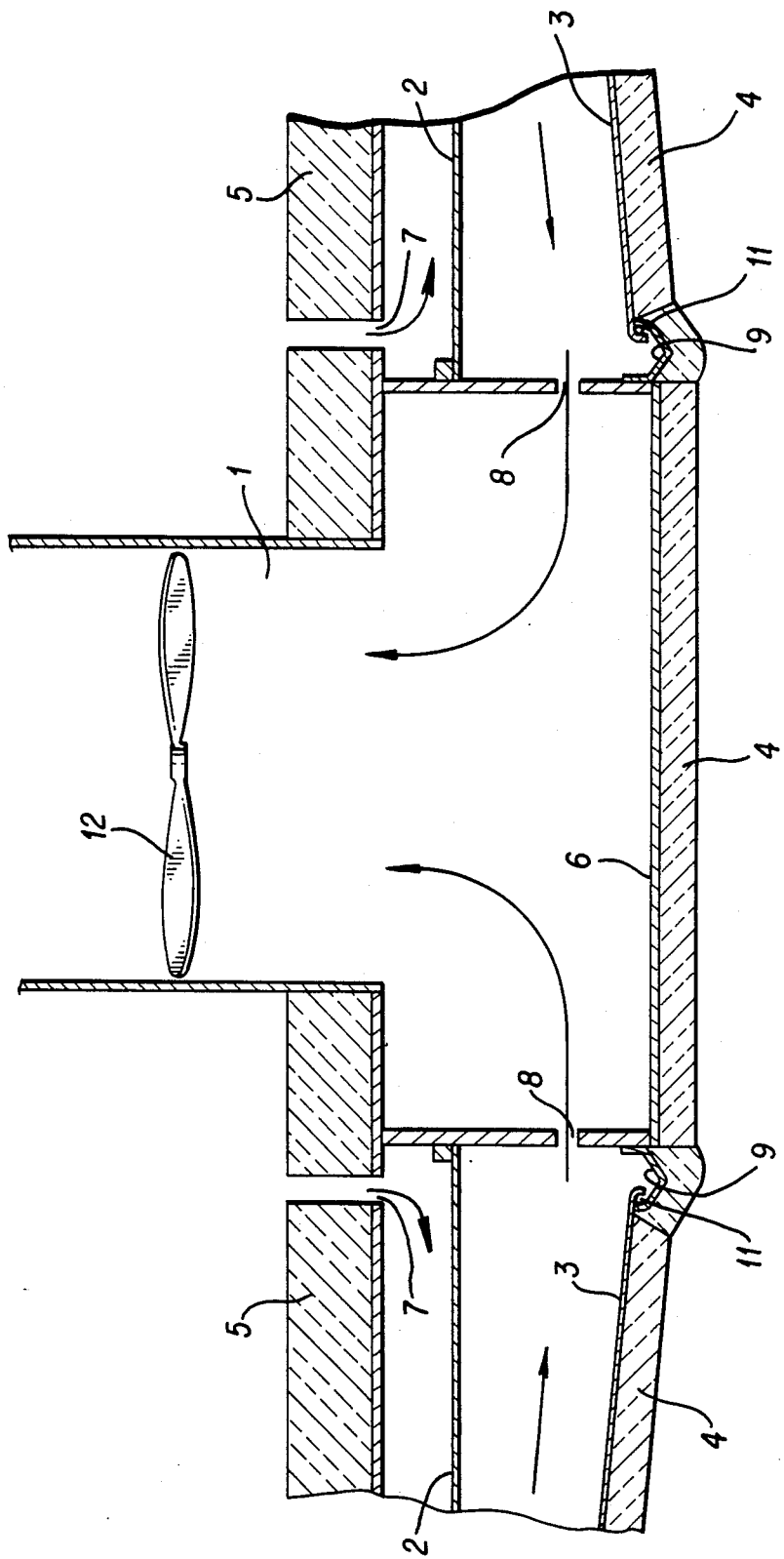

FIG. 1 presents the cross section of the premises housing animals which is equipped with a system according to this invention, and FIG. 2 presents a cross section of the central regions of the system, enlarged.

As shown in FIG. 1, that portion of the premises for housing animals is defined by wall portions of the premises, including sidewall portions and a top wall portion or inner ceiling 5.

Through the inner ceiling 5 leads one or more ventilation ducts 1 to the roof of the premises. The ventilation duct 1 or ducts connect to the collecting air flue 6, which travels through the length of the facility. The fan 12 attends to the ventilation so, that in normal function the duct 1 acts as a flue for outgoing air.

In the sidewalls of the collecting air flue 6 there are two longitudinal slits 8, the added areas of which correspond to the cross-sectional area of the ducts 1 for a steady flow of the outgoing air. Due to a low pressure or vacuum fresh air infiltrates to the housing premises through the long slits 7 in the inner ceiling or in the sheets 5.

The incoming fresh air is separated from the outgoing air through a heat exchanging sheet 2. The outgoing air transfers a part of its thermal energy to the incoming fresh air via the sheet 2. The heat insulation 4 on the lower surface of the lower sheet 3 prevents the outgoing air, which already has transferred heat to the incoming air, from cooling the air inside the facility through the sheet 3. This is a decisive improvement for example to the system described in the FI-Patent publication No. 62413, that system necessarily having a significantly lower thermal benefiting ratio. In addition the heat insulation prevents condensed water from dropping into the housing from the lower surface of the sheet 3.

The humidity condensing on the heat exchanging sheet 2 drops on the sheet 3 and the water is led to drainage channel 9 to be disposed of. If ice is formed on the lower surface of sheet 2 during frost, the direction of the air current can be changed for a moment and the ice which is loosened by the warm air flowing above sheet 2 drops on the surface of sheet 3, and melts into channel 9. The formation of ice and water in the heat exchanger is favourable, since the vaporization energy then is derived from the outgoing air. This improves the thermal benefiting ratio of the system, and the area of the sheets 2 and 3 can be significantly reduced compared to the areas of those in for example the system described in the FI-Patent publication No. 62413.

The trundles 10 and the hinge structure 11 at the root of sheet 3 enable adjustment of the space between sheets 2 and 3. The sheet 3 hangs from a joint wire which consists of several adjoining wires and trundles 10, the joint wire being gathered by a winch. By turning the hoist the whole sheet 3 can be lowered down to for instance a 30° angle, and thus the lower surface of sheet 2 and the whole sheet 3 can easly be cleaned. Furthermore, when the heat exchange system is not needed (for instance during summer) the thermal benefiting ratio in this position is almost zero. With the winch the benefiting ratio can thus be changed from zero to maximum.

If the ventilation is brought to a standstill the inner ceiling 5 must be totally heat insulated. In regular, continuous ventilation the heat insulation of the inner ceiling 5 can be zero near the collecting air flue 6, and gradually increase towards maximum by the outer surface of sheet 2.

The thickness of the heat insulation layer 4 on sheet 3 conveniently increases from the outer edge towards the collecting air flue 6. This insulation layer can be made for example by glueing sheets of Styrox on the lower surface of sheet 3, or by spraying polyurethane foam on the lower surface of sheet 3. The heat insulation ability of sheet 3 should in essence correspond with the heat insulation ability normally required by an inner ceiling 5.

What is claimed is:

1. A ventilation and heat exchanging system for a premises housing animals, the system having at least one fan, at least one duct for outgoing air extending from a general collecting air flue to outside the premises, adjacent outer and inner sheets connected to the general collecting air flue, the sheets defining therebetween a space opening to inside the premises and connecting the general collecting air flue to the inside of the premises for passage of outgoing air, the outer sheet and a heat insulated wall portion of the premises defining a passageway extending between the inside of the premises and a ventilation duct for air intake, the ventilation duct connecting said passageway to outside the premises for incoming air, the outer sheet permitting exchange of heat between outgoing air passing through said space from inside the premises and incoming air passing through said passageway from outside the premises, the inner sheet separating air in said space from air inside of the premises, the inner sheet being insulated by a heat insulation layer in the vicinity of said at least one duct for outgoing air and said ventilation duct, the insulated sheet in said vicinity having a heat insulating ability substantially corresponding to the heat insulating ability of said insulated wall portion, further including means for adjusting the space between the outer and inner sheets.

2. A ventilation and heat exchanging system for a premises housing animals, the system having at least one fan, at least one duct for outgoing air extending from a general collecting air flue to outside the premises, adjacent outer and inner sheets connected to the general collecting air flue, the sheets defining therebetween a space opening to inside the premises and connecting the general collecting air flue to the inside of the premises for passage of outgoing air, the outer sheet and a heat insulated wall portion of the premises defining a passageway extending between the inside of the premises and a ventilation duct for air intake, the ventilation duct connecting said passageway to outside the premises for incoming air, the outer sheet permitting exchange of heat between outgoing air passing through said space from inside the premises and incoming air passing through said passageway from outside the premises, the inner sheet separating air in said space from air inside of the premises, the inner sheet being insulated by a heat insulation layer in the vicinity of said at least one duct for outgoing air and said ventilation duct, the insulated sheet in said vicinity having a heat insulating ability substantially corresponding to the heat insulating ability of said insulated wall portion, wherein the thickness of said heat insulation layer (4) decreases from an inner edge of the inner sheet (3) in the vicinity of said general collecting air flue (6) towards an outer edge of the inner sheet away from said general collecting air flue (6) and that a surface of the general collecting air flue (6) bordering to the inside of the premises is equipped with a heat insulating layer of a thickness (4) corresponding to a maximum thickness of the heat insulation layer insulating said inner sheet in the vicinity of said flue (6).

3. A ventilation and heat exchanging system for a premises housing animals, the system having at least one fan, at least one duct for outgoing air extending from a general collecting air flue to outside the premises, adjacent outer and inner sheets connected to the general collecting air flue, the sheets defining therebetween a space opening to inside the premises and connecting the general collecting air flue to the inside of the premises for passage of outgoing air, the outer sheet and a heat insulated wall portion of the premises defining a passageway extending between the inside of the premises and a ventilation duct for air intake, the ventilation duct connecting said passageway to outside the premises for incoming air, the outer sheet permitting exchange of heat between outgoing air passing through said space from inside the premises and incoming air passing through said passageway from outside the premises, the inner sheet separating air in said space from air inside of the premises, the inner sheet being insulated by a heat insulation layer in the vicinity of said at least one duct for outgoing air and said ventilation duct, the insulated sheet in said vicinity having a heat insulating ability substantially corresponding to the heat insulating ability of said insulated wall portion, the thickness of said heat insulation layer decreasing from an inner edge of the inner sheet in the vicinity of said general collecting air flue towards an outer edge of the inner sheet away from said general collecting air flue.

4. A ventilation and heat exchanging system for a premises housing animals, the system having at least one fan, at least one duct for outgoing air extending from a general collecting air flue to outside the premises, adjacent outer and inner sheets connected to the general collecting air flue, the sheets defining therebetween a space opening to inside the premises and connecting the general collecting air flue to the inside of the premises for passage of outgoing air, the outer sheet and a heat insulated wall portion of the premises defining a passageway extending between the inside of the premises and a ventilation duct for air intake, the ventilation duct connecting said passageway to outside the premises for incoming air, the outer sheet permitting exchange of heat between outgoing air passing through said space from inside the premises and incoming air passing through said passageway from outside the premises, the inner sheet separating air in said space from air inside of the premises, the inner sheet being pivotably connected to the general collecting air flue at an inner edge of said inner sheet, the inner sheet having an outer edge disposed away from the general collecting air flue, the inner sheet being insulated by a heat insulation layer in the vicinity of said at least one duct for outgoing air and said ventilation duct, the insulated sheet in said vicinity having a heat insulating ability substantially corresponding to the heat insulating ability of said insulated wall portion; and further including means for raising and lowering the outer edge of the inner sheet towards or away from the outer sheet with said inner sheet pivoting at said pivotable connection, to regulate the flow of air through said space.

5. A system in accordance with claim 1 characterized in that the edge of the inner sheet (3) which is on the side of the general collecting air flue (6) is connected to a water drainage channel (9).

6. A system in accordance with claim 5, characterized in that the sidewalls of the general collecting air flue (6), to which the aforementioned sheets (2 and 3) connect, is equipped with at least one narrow slit (8), having an area corresponding with the cross-sectional area of said at least one duct (1) for outgoing air.

* * * * *

UNITED STATES PATENT AND TRADEMARK OFFICE
CERTIFICATE OF CORRECTION

PATENT NO. : 4,671,350
DATED : June 9, 1987
INVENTOR(S) : Risto Toukola

It is certified that error appears in the above-identified patent and that said Letters Patent is hereby corrected as shown below:

First page, block [21]: "706,941" should be deleted and substituted therefor -- 708,941 --

In the specification, column one, line 9: delete "extend".

Signed and Sealed this

Ninth Day of February, 1988

Attest:

DONALD J. QUIGG

Attesting Officer

Commissioner of Patents and Trademarks